United States Patent
Anderson et al.

(10) Patent No.: US 7,587,479 B2
(45) Date of Patent: Sep. 8, 2009

(54) SYSTEM AND METHOD FOR COMPUTING CONCURRENT NETWORK CONNECTION INFORMATION

(75) Inventors: Robert Eric Anderson, Redmond, WA (US); Tariq Anwar Dennison, New York, NY (US)

(73) Assignee: Microsoft Corporation, Redmond, WA (US)

( * ) Notice: Subject to any disclaimer, the term of this patent is extended or adjusted under 35 U.S.C. 154(b) by 829 days.

(21) Appl. No.: 10/949,148

(22) Filed: Sep. 23, 2004

(65) Prior Publication Data

US 2006/0064496 A1    Mar. 23, 2006

Related U.S. Application Data

(60) Provisional application No. 60/506,210, filed on Sep. 25, 2003.

(51) Int. Cl.
*G06F 15/173* (2006.01)
(52) U.S. Cl. ..................................... 709/223
(58) Field of Classification Search ................ 709/223, 709/220, 217
See application file for complete search history.

(56) References Cited

U.S. PATENT DOCUMENTS 6,976,134 B1 * 12/2005 Lolayekar et al. ........... 711/148
7,328,250 B2 *  2/2008 Wang ......................... 709/207

FOREIGN PATENT DOCUMENTS

WO      WO01/95587      12/2001

* cited by examiner

*Primary Examiner*—David Y Eng
(74) *Attorney, Agent, or Firm*—Perkins Coie LLP

(57) ABSTRACT

A system for determining a number of concurrent connections for a web hosting service at a start time of a connection record is provided. The system provides connection records corresponding to a time in which a new connection was established with a server of the web hosting service. Each record has a start time and an end time indicating the start and end of the connection. The system selects a connection record whose number of concurrent connections is to be determined. The system then identifies each connection record whose start time is less than or equal to the start time of the selected connection record and whose end time is greater than the start time of the selected connection record. The system sets the number of concurrent connections for the start time of the connection record to the number of identified connection records. The system also determines a time in which the number of concurrent connections is over a specified limit.

16 Claims, 7 Drawing Sheets

SYSTEM AND METHOD FOR COMPUTING CONCURRENT NETWORK CONNECTION INFORMATION

CROSS-REFERENCE TO RELATED APPLICATION

This application claims the benefit of U.S. Provisional Application No. 60/506,210, entitled "SYSTEM AND METHOD FOR COMPUTING CONCURRENT NETWORK CONNECTIONS," filed on Sep. 25, 2003 and is hereby incorporated by reference in its entirety.

TECHNICAL FIELD

The invention relates generally to network computer systems, and more particularly to computer systems and methods for calculating the number and duration of concurrent network connections.

BACKGROUND

The Internet is quickly becoming the preferred data communications medium for a broad class of computer users ranging from private individuals to large multinational corporations. Such users now routinely employ the Internet to access information, distribute information, correspond electronically, and even conduct personal conferencing. An ever-growing number of individuals, organizations, and businesses have established a presence on the Internet through "Web pages" on the World Wide Web (WWW). One reason for the phenomenal success of the Internet and the WWW is the successful integration of textual, graphical, and audio data. Supporting dynamic real-time media, such as real-time video and audio, on the Internet facilitates the development of new applications like real-time visual communication, entertainment, and distance learning and training, while enhancing the capability of existing applications. Internet video delivery in particular has shown great commercial potential and, therefore, has encouraged a substantial number of commercial developments.

The primary device responsible for delivering video to Internet users is a streaming server. In operation, the streaming server utilizes available bandwidth to provide simultaneous data and video broadcasts to a plurality of clients. For a variety of reasons, bandwidth on the Internet has become both a critical resource and a key cost factor for Internet Service Providers (ISPs). This has led to a variety of efforts being undertaken to improve the capability to audit, monitor, and limit bandwidth usage.

Reliable auditing and monitoring of bandwidth usage is important in two types of web hostings offered by ISPs, i.e., "co-location" and "dedicated/shared-server" services. In co-location service, a customer owns a dedicated web server located at an ISPs facility and purchases Internet bandwidth from the ISP. The ISP buys bandwidth in bulk and resells it to each customer. In dedicated-server service, customers rent dedicated servers that are owned and maintained by the ISP. In shared-server service, customers rent disk space, and share CPU and ETHERNET bandwidth with other web site customers on the ISP's equipment. While this provides a low cost service for the customer, it frequently results in an overcrowding of the equipment and long delays or inaccessibility of the sites sharing the server. When the ISP has a clear picture of usage patterns, users can be relocated onto servers that do not clash with other users, or changed to dedicated-server service.

Regardless of the delivery method, accurate auditing and monitoring of the bandwidth usage by each web hosting customer is needed. ISPs without bandwidth usage tools may inaccurately charge customers for bandwidth usage based on average bandwidth usage or peak usage, and some ISPs may even resort to flat rate fees.

Further exacerbating the problem is the fact that the web hosting business is becoming increasingly competitive. Customers are demanding guaranteed service and accountability for the access bandwidth charges by their ISPs. The customers too would welcome the ability to monitor their own usage patterns in real time. ISPs need to differentiate their services and provide a guaranteed quality of service to ensure customer satisfaction. In addition, unlike hit-rate data provided by other software, bandwidth usage patterns give web site owners a different angle for gauging responses to changes in content on their sites.

From a strategic standpoint, real-time bandwidth monitoring is important for the ISPs to determine if sufficient bandwidth is being purchased, to plan the growth of the network, and to analyze unusual bandwidth patterns which may signify problems with the server or the ISP's equipment.

One technique for calculating the number of concurrent connections analyzes data records for each connection. Each data record includes a connect time and disconnect time for the connection. The technique calculates a concurrent connections count for each record. The technique, however, incorrectly assigns counts to some records that have the same connect time. For example, when there are no current connections and three connection records have the same connect time, the technique assigns a count of one to the first data record encountered, a count of two to the second data record encountered, and a count of three to the third data record encountered. These assignments are incorrect because all three data records should have a count of three.

Accordingly, there is need for a method and apparatus for accurately calculating concurrent connections.

SUMMARY

A method and system for determining a number of concurrent connections at a start time of a connection record are provided. The system provides connection records that each have a start time and an end time. The system selects a connection record whose number of concurrent connections is to be determined as of its start time. The system then identifies each connection record whose start time is less than or equal to the start time of the selected connection record and whose end time is greater than the start time of the selected connection record. The system sets the number of concurrent connections for the start time of the selected connection record to the number of identified connection records.

A method and system for determining a time over concurrency limit are provided. The system provides usage records that each have a start time and an end time. The system then repeats the following until all the records are selected. The system first selects the record with the next higher start time, starting with the earliest start time. The system then sets a concurrency number to the number of records that have been selected with an end time greater than the start time of the currently selected record. When the concurrency number is greater than the concurrency limit, the system increments the time over concurrency limit by the difference between the start time of the currently selected record and the minimum end time, greater than the start time of the currently selected record, of a previously selected record that has not already been used to increment the time over concurrency limit.

It is to be understood that both the foregoing general description and the following detailed description are exemplary and explanatory and are intended to provide further explanation of the invention as claimed.

Additional features and advantages of the invention will be set forth in the description which follows, and in part will be apparent from the description, or may be learned by practice of the invention.

BRIEF DESCRIPTION OF THE DRAWINGS

The features and other advantages of the invention will be realized and attained by the methods, systems, and apparatus particularly pointed out in the written description and claims hereof, as well as the accompanying drawings. In the drawings:

DETAILED DESCRIPTION

In the following detailed description of an embodiment, reference is made to the accompanying drawings that form a part thereof, and in which is shown by way of illustration a specific embodiment in which the invention may be practiced. This embodiment is described in sufficient detail to enable those skilled in the art to practice the invention and it is to be understood that other embodiments may be utilized and that structural changes may be made without departing from the scope of the present invention. The following detailed description is, therefore, not to be taken in a limited sense.

Figure 1:
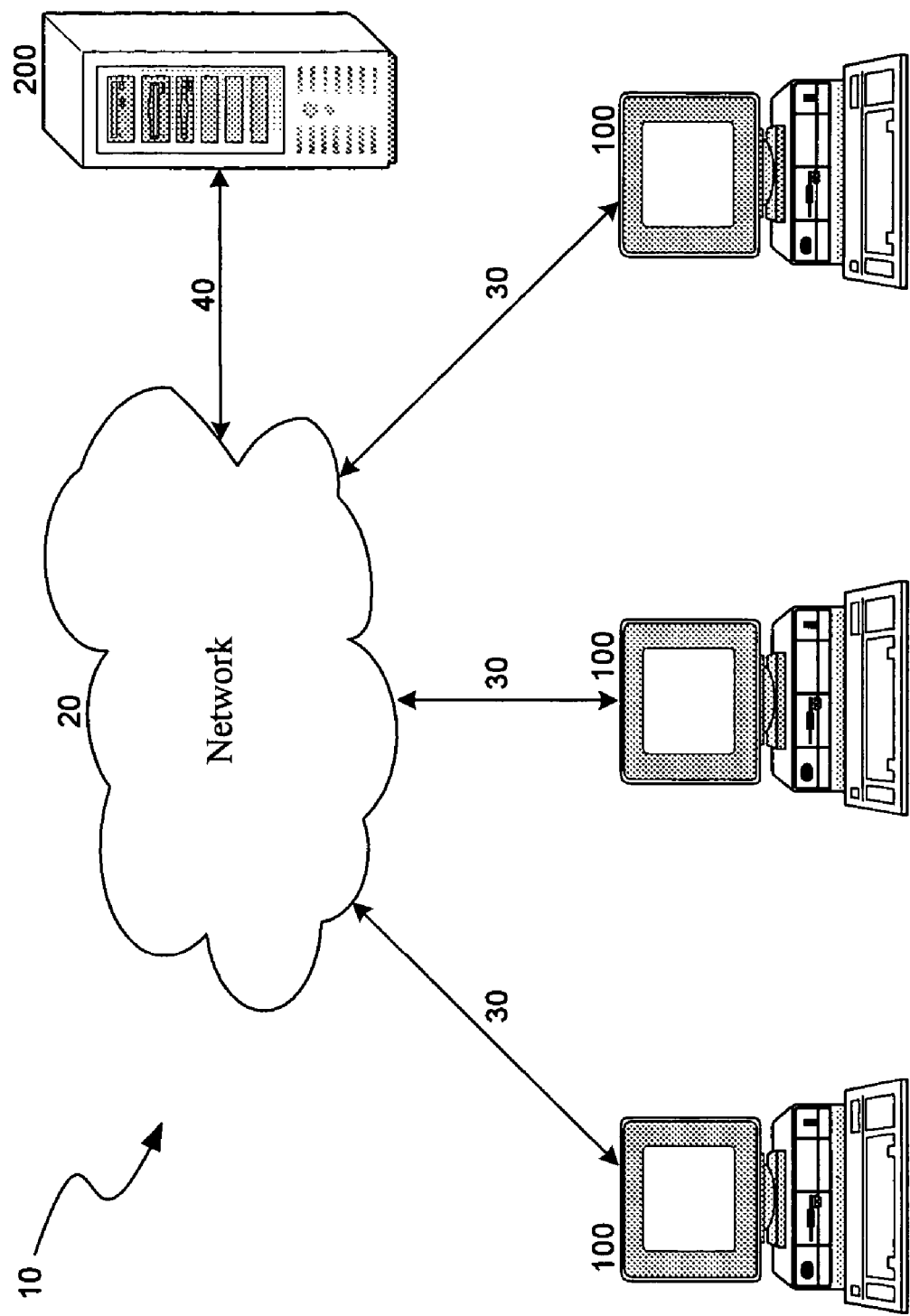
FIG. 1 is a diagram illustrating a computer network system in accordance with an exemplary embodiment of the present system.

Referring first to FIG. 1, a network system 10 is comprised of a plurality of interconnected computers and microprocessors hosting a plurality of operating systems. By way of example, network system 10 may be comprised of Pentium™ based microprocessors operating on Windows/NT, UNIX and/or Windows/CE operating systems. Network system 10 includes a plurality of client devices 100 and a data streaming server 200. There may be other devices coupled to network system 10, but they are not relevant to the subject matter disclosed in the present disclosure and for the sake of brevity will not be explained here. The devices and computers, as shown in FIG. 1, are coupled to a network 20, which may be the Internet, via a series of network cable interfaces. More specifically, client devices 100 are connected to network 20 via cable interface 30, and streaming server 200 is coupled to network 20 via cable interface 40.

Figure 2:
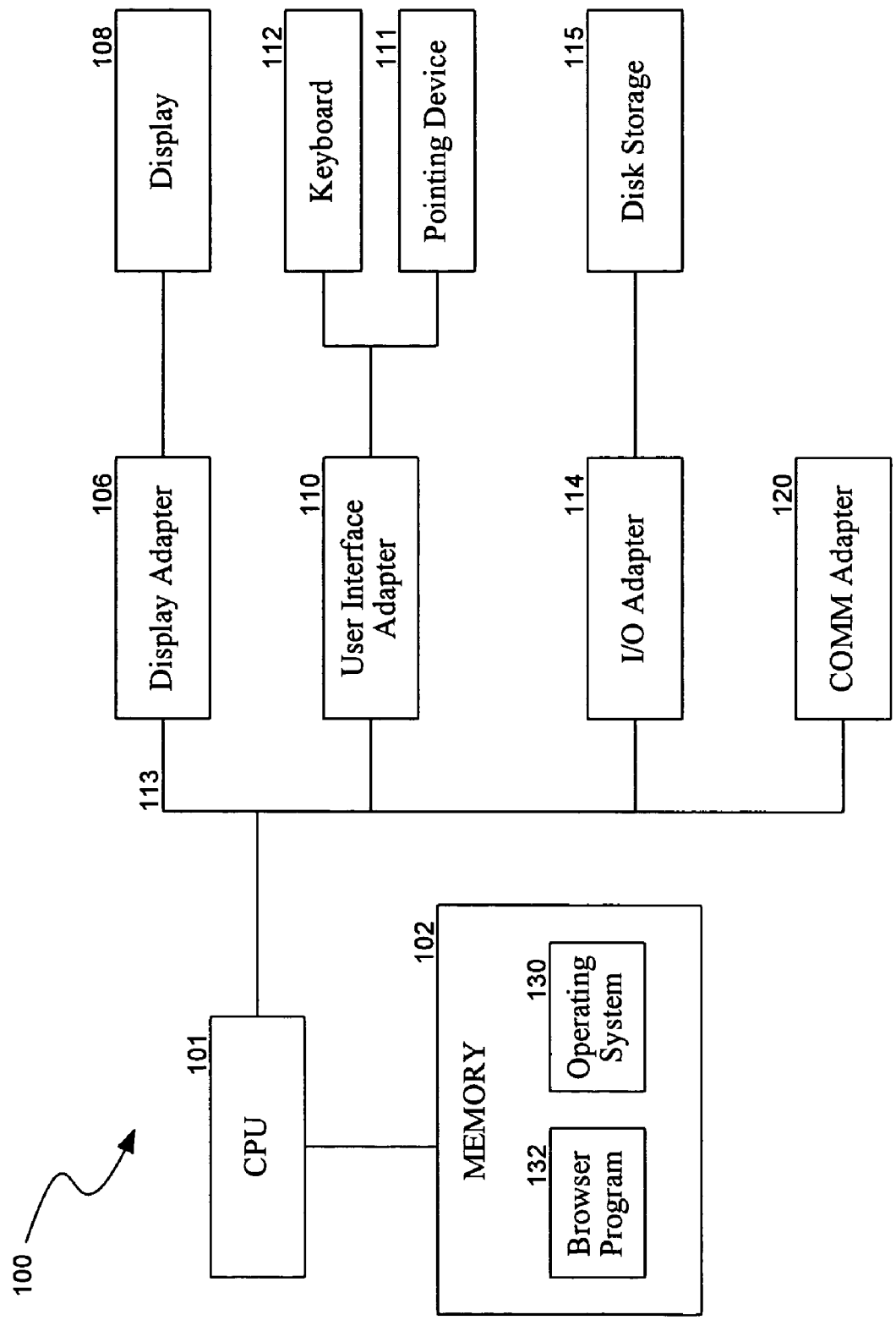
FIG. 2 is a diagram illustrating the major components of a client device in accordance with the present invention.

A detailed diagram of client device 100 is shown in FIG. 2. As shown, client device 100 is comprised of a central processor unit (CPU) 101, a memory 102, a display adapter 106, a display 108, a user interface (UI) adapter 110, a pointing device 111, a keyboard 112, an input/output (I/O) adapter 114, a disk storage unit 115, and a communications adapter 120 for providing a communications function. Memory 102 includes an operating system 130 for operating the device and a browser program 132 for rendering and displaying content. As shown, the various components of each client device 100 communicate through a system bus 113 or similar architecture. There may be other components as well, but these are not shown to facilitate description of the unique aspects of this embodiment of the invention. The hardware arrangement of this computer, as well as the other computers discussed in this specification, is intentionally shown as general, and is meant to represent a broad variety of architectures, which depend on the particular computing device used. As shown in FIG. 2, display adapter 106 is coupled to display 108, user interface adapter 110 is coupled to pointing device 111 and keyboard 112, I/O adapter 114 is coupled to disk storage unit 115, and communications adapter 120 is coupled to cable interface 30 for providing connectivity between client device 100 and network 20.

Figure 3:
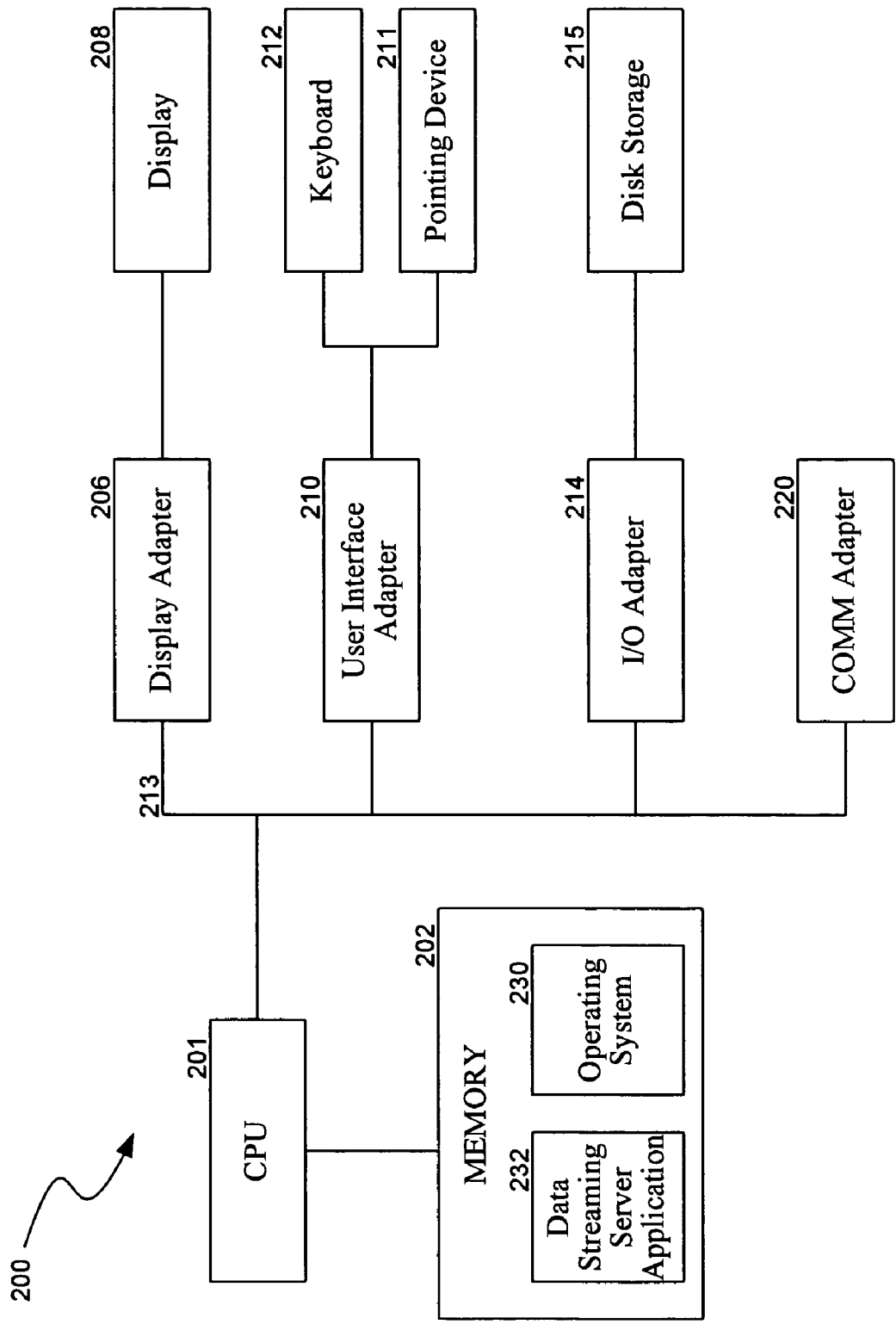
FIG. 3 is a diagram illustrating the major components of a streaming server in accordance with the present invention.

A detailed diagram of streaming server 200 is shown in FIG. 3. As with client devices 100, streaming server 200 is comprised of a CPU 201, a memory 202, a display adapter 206, a display 208, a UI adapter 210, a pointing device 211, a keyboard 212, an I/O adapter 214, a disk storage unit 215, and a communications adapter 220. Memory 202 includes an operating system 230 and a data streaming server application 232. As shown, the various components of streaming server 200 communicate through a system bus 213 or similar architecture. Also, communications adapter 220 is coupled to cable interface 40 for providing connectivity between streaming server 200 and network 20. Thus, in connection with one embodiment, it should be appreciated from the schematic overview illustrated by FIG. 1 and the detailed schematics of FIGS. 2-3 that the present invention may be employed in a distributed computer system environment which has internal, external, and intranet networks collectively represented in the schematic overview by the network 20 to connect clients to World Wide Web servers and other servers within the system in which the present invention is situated.

In one embodiment, the system determines a number of concurrent connections at a designated time. The system identifies each connection whose start time is less than or equal to the designated time and whose end time is greater than the designated time. The system then sets the number of concurrent connections for the designated time to the number of identified connections. When multiple connections have a start time that is the same as the designated time, the system identifies each of the multiple connections so that the number of concurrent connections includes each of the connections having the same start time. In one embodiment, the system identifies the connections by sorting the connections by start time and then repeats the following until all the connections have been selected. The system selects the connections with the next higher start time, starting with the earliest start time. The system places the end times of the selected connections in a logical container. The system then sets the number of concurrent connections for the designated time to the number of end times in the logical container that are greater than the designated time. When a connection spans a time boundary, the system may divide the connection into two connections such that the divided connections do not span a time boundary.

In another embodiment, the system determines a time over concurrency limit for usages, such as network connections.

For example, if the concurrency limit is 5 connections, the system calculates the total time for which there are more than 5 connections. The system may also calculate a time for each unique number over the limit. For example, the system may calculate that the total time over concurrency limit is 10 minutes such that there are 8 minutes with 6 connections and 2 minutes with 7 connections. The system may bill for connections based in part on the time over concurrency limit. The system may determine the time over concurrency limit by repeating the following until all the usages are selected. The system selects the usage with a next higher start time, starting with the earlier start time. The system sets a concurrency number to the number of usages that have been selected with an end time greater than the start time of the currently selected usage. When the concurrency number is greater than the concurrency limit, the system increments the time over concurrency limit by the difference between the start time of the currently selected usage and the minimum end time, greater than the start time of the currently selected usage, of a previously selected usage that has not already been used to increment the time over concurrency limit. In one embodiment, when a usage is selected, the system places an indication of the end time of the selected usage in a logical container and sets the concurrency number to the number of end times in the logical container that are greater than the start time of the currently selected usage. When a usage is selected, the system may place an indication of the end time of the selected usage in a logical container and may increment the time over concurrency limit by the difference of the start time of the currently selected usage and the minimum end time in the logical container that is greater than the start time of the currently selected usage and remove the indication of that minimum end time from the logical container. The usage may correspond to a network connection, use of software (e.g., concurrency limit is number of seat licenses), use of telephone line, or another usage of a resource.

Figure 4:
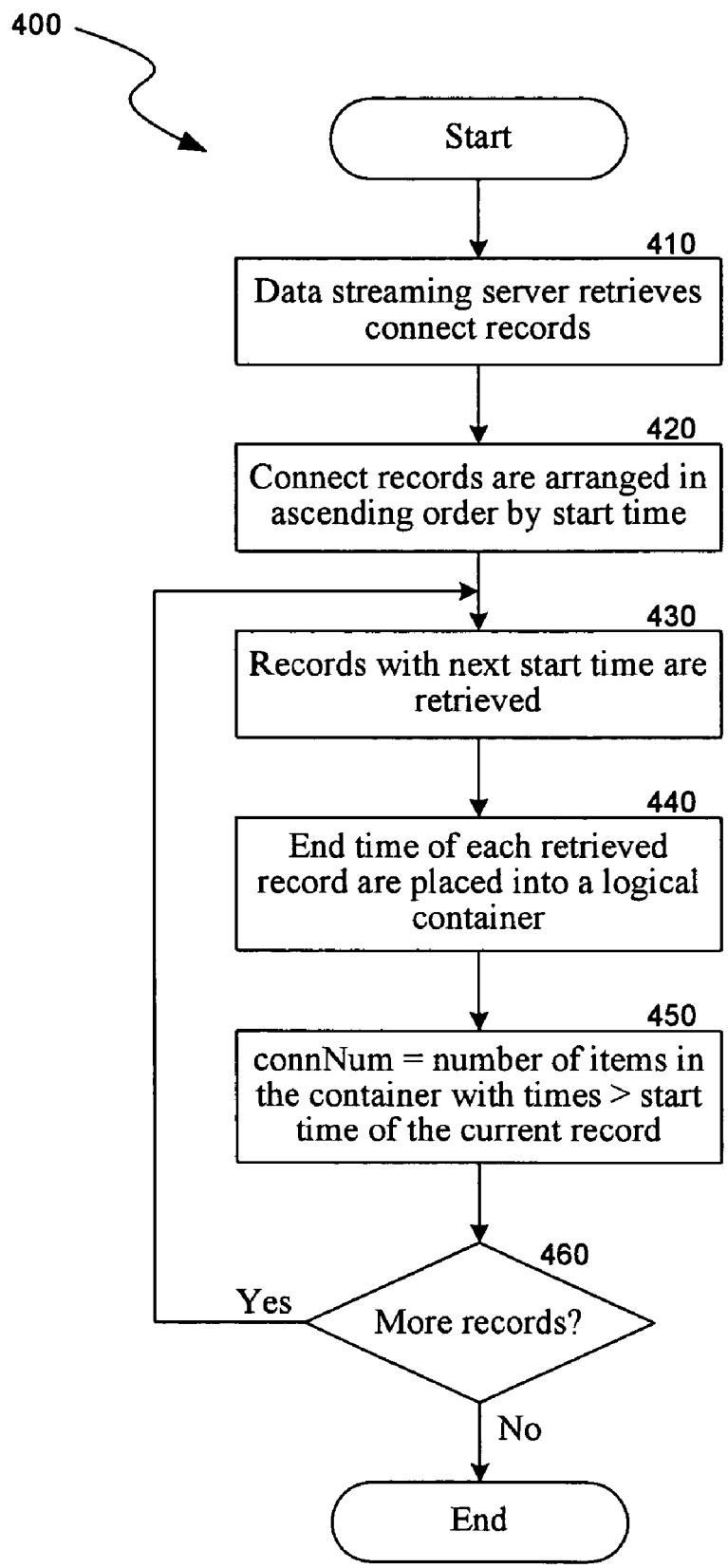
FIG. 4 is a detailed flow chart depicting the steps performed by one embodiment of a concurrency routine in accordance with the present invention.
Figure 5:
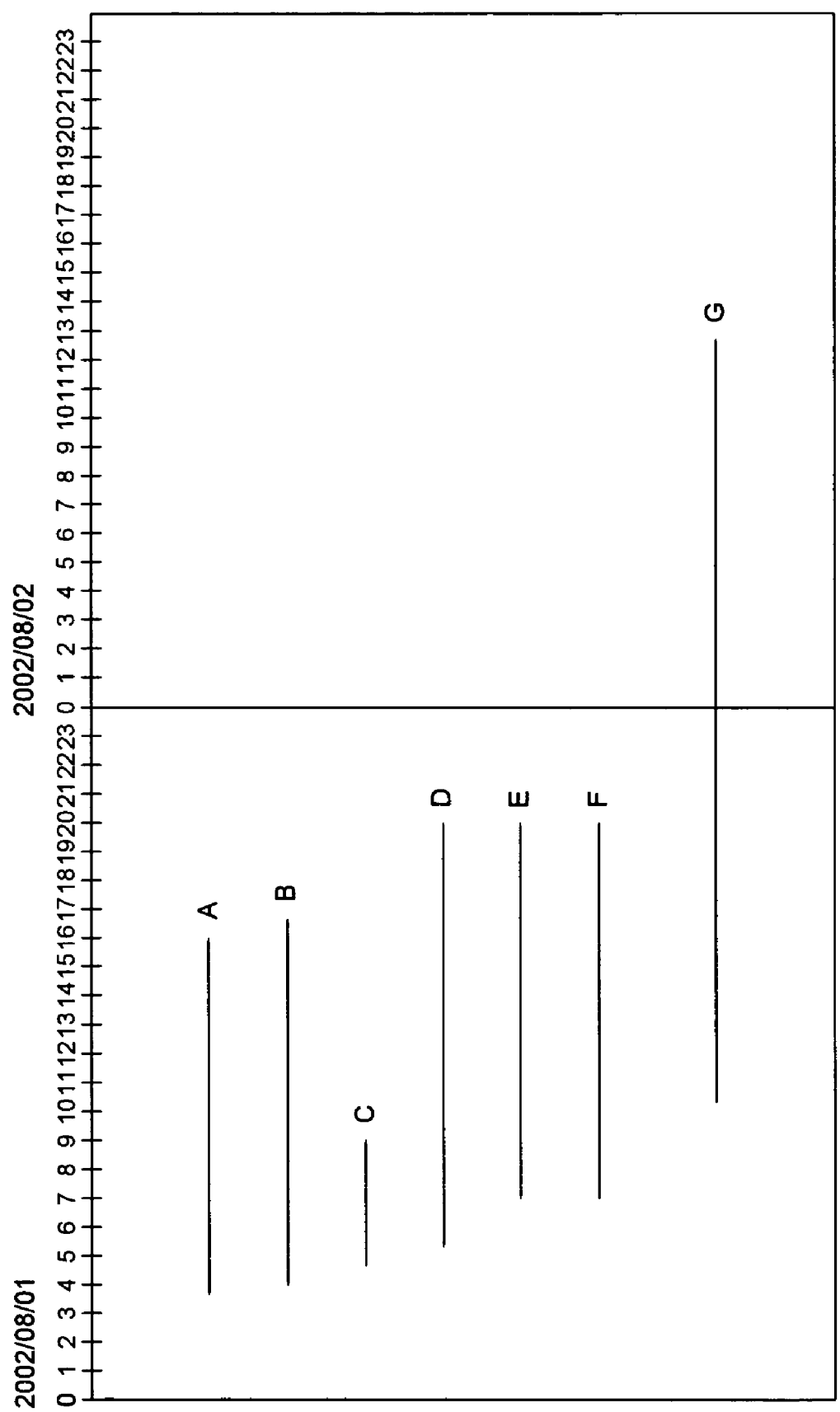
FIG. 5 is an exemplary timeline depicting a plurality of connect records for a plurality of users in accordance with the present invention.

Referring now to FIG. 4, there is shown a detailed flow diagram of one embodiment of a concurrency routine 400 for computing a total number of connections for connect records. As shown, processing begins in step 410 where data streaming server 200 retrieves connect records from data streaming server application 232. Connect records are event-based data that is generated by data streaming server application 232. Connect records are common to data streaming servers and are generally used for recording network traffic between the plurality of client devices 100 and data streaming server 200. Referring now to FIG. 5, there is shown an exemplary timeline depicting connect records for a plurality of users (A-G) who have established a connection. For purposes of explanation, exemplary start and end times for connect records shown in FIG. 5 are illustrated in TABLE 1.

TABLE 1

| Connection ID | Start Time | End Time |
|---|---|---|
| A | 2002-08-01 03:40:49 | 2002-08-01 16:00:12 |
| B | 2002-08-01 03:59:00 | 2002-08-01 16:43:15 |
| C | 2002-08-01 04:42:47 | 2002-08-01 09:04:01 |
| D | 2002-08-01 05:25:03 | 2002-08-01 19:59:00 |
| E | 2002-08-01 07:00:25 | 2002-08-01 19:59:00 |
| F | 2002-08-01 07:00:25 | 2002-08-01 19:59:00 |
| G | 2002-08-01 10:13:52 | 2002-08-02 12:44:17 |

As shown in TABLE 1, a connect record generally comprises a connection ID with an associated start time and end time of a network connection. For example, the first record indicates that one client device 100 connected to streaming server 200 at the start time of 2002-08-01 03:40:49 and received a data stream of a media file until the end time of 2002-08-01 16:00:12. In addition to the start and end times of specific network connections, each connect record may store a number of other data attributes, such as connection ID, client computer network address, user ID, media file ID, or other similar data. Although the above-described connect records are depicted on a 24 hour timeline, one of skill in the art will appreciate that any period of time may be represented (e.g., seconds, minutes, hours, days, months, years, etc.) and may be a configurable parameter. Also, connect records may be in any format that communicates event information related to network connection activity of a streaming server.

As shown in FIG. 5 and TABLE 1, there may be one or more network connections which begin on a first time period (e.g., day) and extend into a second time period. For example, the connection record for connection ID G has a start time of 2002-08-01 10:13:52 (day 1) and an end time of 2002-08-02 12:44:17 (day 2). When this occurs, one embodiment converts individual network connections into multiple connection records. One record will have a start time of the original connection record (e.g., 2002-08-01 10:13:52) and an end time of the time period boundary (e.g., 2002-08-02 00:00:00). A second record will have a start time of the time period boundary (e.g., 2002-08-02 00:00:00) and an end time of the original connection record (e.g., 2002-08-02 12:44:17). The total duration of the network connection does not change. However, the process of separating the single event into two consecutive events simplifies the process of determining concurrency over an extended period of time. This process is referred to as "seeding the connections."

Once the connect records are retrieved and seeded by streaming server 200, processing flows to step 420 where the records are arranged such that the start times are placed in ascending order. The next group of records with the next higher start time is retrieved, starting with the earliest start time (step 430), and the value for end time for each retrieved record is placed into a logical container (step 440). For example, the start times for connection IDs E and F are the same, that is, 2002-08-01 07:00:25. Thus, the connection records for these connection IDs should have the same number of concurrent connections. Both of these records would be retrieved and placed into the container together. The number of connection numbers (connNum) at the start time of the retrieved records equals the number of items in the container with end times greater than the start time of the record (step 450) including all the records just placed in the container. For example, when the records for connection IDs E and F are retrieved and placed in the container at the same time, there will be a total of 6 end times in the container greater than the start time. Thus, connection IDs E and F will have a connection number of 6. After the connNum is computed, processing flows to step 460. If there are more records (step 460), processing flows to step 430. If there are no more records, processing terminates. In the present case, the record associated with connection ID A is retrieved first, and the value of 2002-08-01 16:00:12 is placed into the logical container. The number of records in the container with times greater than the start time of the selected connection record (i.e., 2002-08-01 03:40:49) is 1. Therefore, the number of concurrent connections (connNum) at the start time of the first connection record is 1. Referring to TABLE 2, there is shown a table of connection IDs with the corresponding number of concurrent connections occurring at the start time of each connection. As described above, connection IDs E and F have 6 concurrent connections. The number of concurrent connections for connection ID G is also 6 since connection ID C ended before connection ID G started.

TABLE 2

| Connection ID | Concurrent Connections |
|---|---|
| A | 1 |
| B | 2 |
| C | 3 |
| D | 4 |
| E | 6 |
| F | 6 |
| G | 6 |

Figure 6:
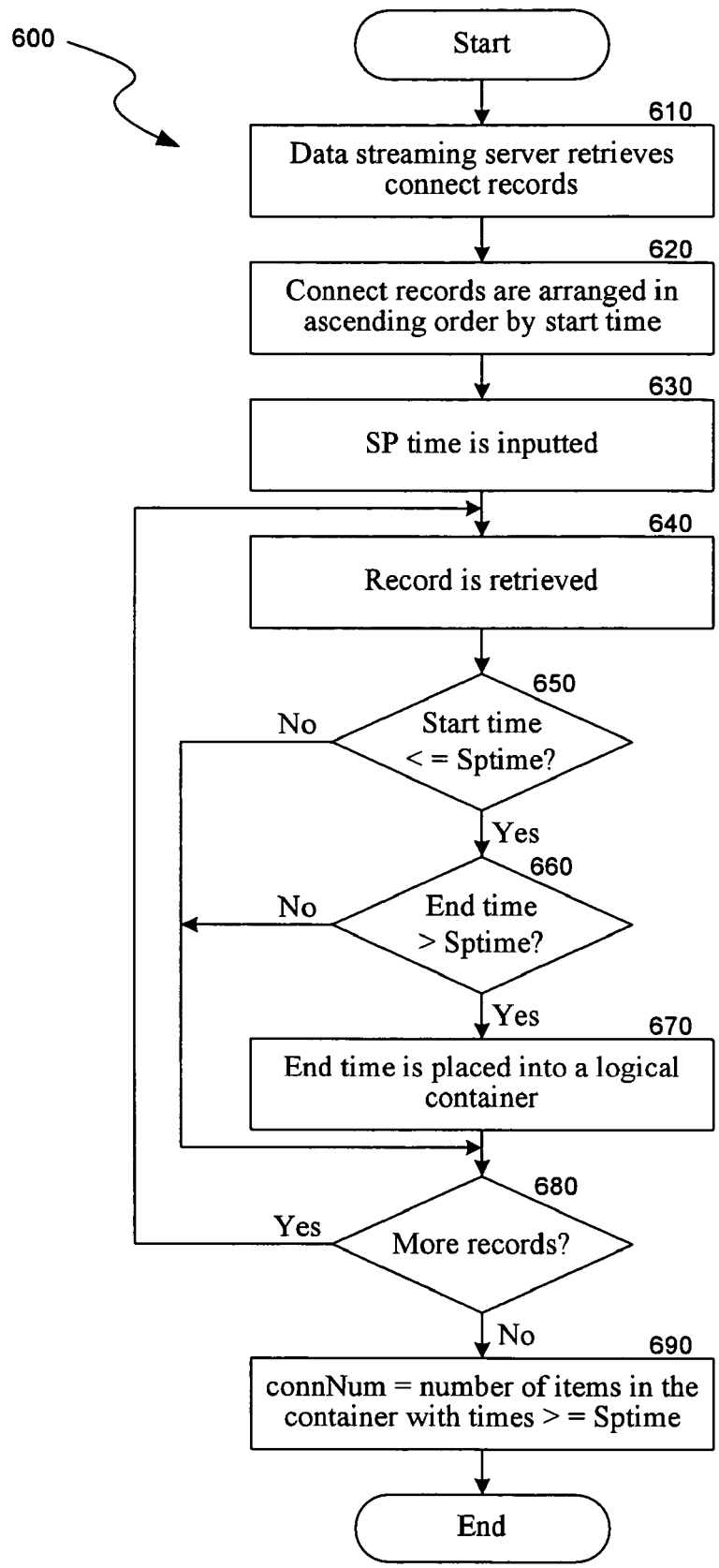
FIG. 6 is a detailed flow chart depicting the steps performed by a second embodiment of a concurrency routine in accordance with the present invention.

Referring now to FIG. 6, there is shown a detailed flow diagram of a second concurrency routine 600 for computing a total number of connections at a time (which may or may not coincide with the start time of a connection record). For example, it may be desirable to compute the number of concurrent connections at 2002-08-01 15:15:00. Referring to FIG. 5 and TABLE 1, it is shown that 15:15:00 does not correspond to a start time or an end time of any record. As shown, processing begins in step 610 where streaming server 200 retrieves and seeds connect records from data streaming server application 232. Processing then flows to step 620 where the records are arranged such that the start times are placed in ascending order. A specified time (SpTime) for concurrency processing is then inputted (step 630). The next record is retrieved (step 640) and the start time of the record is compared to the inputted value for SpTime (step 650). If the value for start time is less than or equal to SpTime, then processing flows to step 660. If the start time is greater than SpTime, processing flows to step 680. In step 660, the present system determines whether the end time is greater than SpTime. If it is, the connect record occurs during the SpTime and the end time of the connect record is placed into a logical container (step 670). If the end time is less than or equal to SpTime, then the connect record does not occur during the SpTime and processing flows to step 680. In step 680, the present system determines whether there are any more connect records to be evaluated. If there are more records, processing flows to step 640 and a new record is retrieved. If there are not any more records, processing flows to step 690, where the number of concurrent connections during the specified period of time is calculated. In this case, the total number of concurrent connections at 2002-08-01 15:15:00 is 6.

Figure 7:
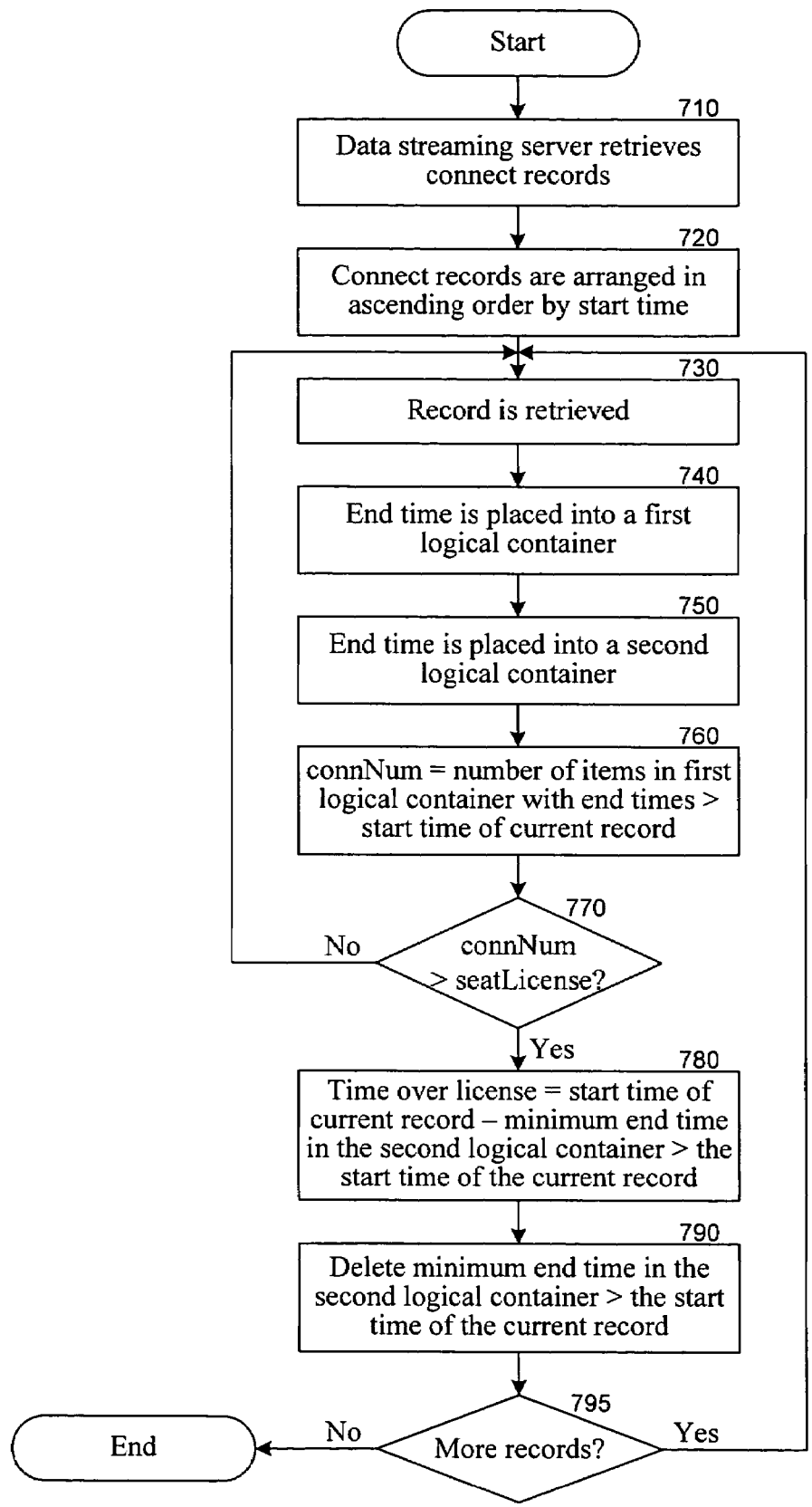
FIG. 7 is a detailed flow chart depicting the steps performed by the present invention when it computes the total amount of time a connection has spent over a limit of concurrent connections.

Yet another embodiment of the present invention is adapted to determine whether the number of concurrent connections exceeds a maximum value and to compute the amount of time that the number of concurrent connections has exceeded the maximum value. Referring now to FIG. 7, there is shown a detailed flow diagram for computing the total amount of time a connection has spent over a limit of concurrent connections. As shown, processing begins in step 710 where data streaming server 200 retrieves connect records from data streaming server application 232. The records are then arranged such that the start times are placed in ascending order (step 720). The next record is retrieved, starting with the first (step 730), and the value for end time is placed into a first logical container (step 740). The end time is also placed into a second logical container (step 750). The number of concurrent connection numbers (connNum) at the start time of the retrieved record is then computed (step 760). As shown, connNum equals the number of items in the first logical container with end times greater than the start time of the record. Once the total number of concurrent connections has been computed, processing flows to step 770, where the value for connNum is compared to a maximum number of concurrent connections (seatLicense). If connNum is greater than seatLicense, processing flows to step 780. If connNum is less than or equal to seatLicense, processing flows to step 730. In step 780, the amount of time a plurality of concurrent connections has exceeded a limit of concurrent connections equals the start time of the retrieved record minus the minimum end time in the second logical container that is greater than the start time of the current record. For example, if the start time of the retrieved connection is 2002-08-01 05:25:03 and the second logical container contains the contents shown in TABLE 3, then the amount of time spent over the limit of concurrent connections equals 3:38:58 (i.e., 2002-08-01 09:04:01-2002-08-01 05:25:03).

TABLE 3

| Connection ID | End Time |
|---|---|
| A | 2002-08-01 16:00:12 |
| B | 2002-08-01 16:43:15 |
| C | 2002-08-01 09:04:01 |
| D | 2002-08-01 19:59:00 |

Once the amount of time a connection has spent over a limit of concurrent connections has been computed (step 780), processing flows to step 790 where the minimum end time in the second logical container that is greater than the start time of the current record (as determined in the previous step) is removed from the second logical container. If there are more records (step 795), processing flows to step 730. If there are no more records, processing terminates.

From the foregoing description, it will be appreciated that the present invention provides an efficient system and method for calculating the number and duration of concurrent network connections. The present invention has been described in relation to particular embodiments which are intended in all respects to be illustrative rather than restrictive. Those skilled in the art will appreciate that many different combinations of hardware will be suitable for practicing the present invention. Many commercially available substitutes, each having somewhat different cost and performance characteristics, exist for each of the components described above.

Although aspects of the present invention are described as being stored in memory, one skilled in the art will appreciate that these aspects can also be stored on or read from other types of computer-readable media, such as secondary storage devices, like hard disks, floppy disks, or CD-ROMs; a carrier wave from the Internet; or other forms of RAM or ROM. Similarly, the method of the present invention may conveniently be implemented in program modules that are based upon the flow charts in FIGS. 4, 6 and 7. No particular programming language has been indicated for carrying out the various procedures described above because it is considered that the operations, steps, and procedures described above and illustrated in the accompanying drawings are sufficiently disclosed to permit one of ordinary skill in the art to practice the instant invention. Moreover, there are many computers and operating systems which may be used in practicing the instant invention and therefore no detailed computer program could be provided which would be applicable to these many different systems. Each user of a particular computer will be aware of the language and tools which are most useful for that user's needs and purposes.

Alternative embodiments will become apparent to those skilled in the art to which the present invention pertains without departing from its spirit and scope. Accordingly, the scope of the present invention is defined by the appended claims rather than the foregoing description.

We claim:

1. A method in a computer system having a memory and a processor for determining a time over concurrency limit, the method comprising:
   providing usage records, each record having a start time and an end time; and
   repeating the following with a computer until all the records are selected,
      selecting the record with the next later start time, starting with the earliest start time;
      setting a concurrency number to the number of records that have been selected with an end time later than the start time of the currently selected record; and
      when the concurrency number is greater than a concurrency limit,
         choosing a previously selected record with the minimum end time that is later than the start time of the currently selected record and that has not already been chosen to increment the time over concurrency limit, and
         incrementing the time over concurrency limit by the difference between the start time of the currently selected record and the end time of the chosen record
   wherein
      when a record is selected, an indication of the end time of the selected record is placed in first and second logical containers,
      the concurrency number is set to the number of end times in the first logical container that are later than the start time of the currently selected record,
      the chosen record corresponds to the minimum end time in the second logical container that is later than the start time of the currently selected record, and
      after the time over concurrency limit is incremented, the indication of the end time corresponding to the chosen record is removed from the second logical container.

2. The method of claim 1 wherein a usage record corresponds to a connection record.

3. The method of claim 1 wherein a usage record corresponds to a software checkout record.

4. The method of claim 1 wherein a usage record corresponds to a telephone connection record.

5. The method of claim 1 including charging for usage based on the time over concurrency limit.

6. The method of claim 1 including maintaining a separate time over concurrency limit for each unique concurrency number.

7. A computer-readable storage medium containing instructions that when executed by a computer system having a memory and a processor cause the computer system to determine a time over concurrency limit for usages, by a method comprising repeating the following until all the usages are selected:
   selecting the usage with a next later start time, starting with the earliest start time;
   setting a concurrency number to the number of usages that have been selected with an end time later than the start time of the currently selected usage; and
   when the concurrency number is greater than the concurrency limit, with a processor, incrementing the time over concurrency limit by the difference between the start time of the currently selected usage and the minimum end time, later than the start time of the currently selected usage, of a previously selected usage that has not already been used to increment the time over concurrency limit.

8. The computer-readable storage medium of claim 7 wherein:
   when a usage is selected, an indication of the end time of the selected usage is placed in a logical container; and
   the concurrency number is set to the number of end times in the logical container that are later than the start time of the currently selected usage.

9. The computer-readable storage medium of claim 7 wherein:
   when a usage is selected, an indication of the end time of the selected usage is placed in a logical container; and
   the increment of the time over concurrency limit is set to the difference between the start time of the currently selected usage and the minimum end time in the logical container that is later than the start time of the currently selected usage, and the indication of that minimum end time is removed from the logical container.

10. The computer-readable storage medium of claim 7 wherein:
    when a usage is selected, an indication of the end time of the selected usage is placed in a first and a second logical container;
    the concurrency number is set to the number of end times in the first logical container that are later than the start time of the currently selected usage; and
    the increment of the time over concurrency limit is set to the difference between the start time of the currently selected usage and the minimum end time in the second logical container that is later than the start time of the currently selected usage, and the indication of that minimum end time is removed from the second logical container.

11. The computer-readable storage medium of claim 7 wherein a usage corresponds to a connection.

12. The computer-readable storage medium of claim 7 wherein a usage corresponds to a usage of software.

13. The computer-readable storage medium of claim 7 wherein a usage corresponds to a telephone usage.

14. The computer-readable storage medium of claim 7 including charging for usage based on the time over concurrency limit.

15. The computer-readable storage medium of claim 7 including maintaining a separate time over concurrency limit for each unique concurrency number.

16. A computer system having a memory and a processor for determining a time over concurrency limit, the system comprising:
    a component that provides usage records for each of a plurality of network connections, each record having a start time and an end time; and
    a component, comprising computer-executable instructions stored in memory that when executed by the processor, and until all the records are selected, repeatedly:
       selects the record with the next later start time relative to the previously selected record, starting with the record with the earliest start time;
       determines the number of records that have been selected with an end time later than the start time of the currently selected record;
       sets a concurrency number to the determined number of records that have been selected with an end time later than the start time of the currently selected record;

determines, from the previously selected records that have not already been used to increment the time over concurrency limits, the record with the minimum end time; and when the concurrency number exceeds a concurrency limit, increments the time over concurrency limit by the difference between the start time of the currently selected record and the end time of the determined record.

* * * * *

UNITED STATES PATENT AND TRADEMARK OFFICE
CERTIFICATE OF CORRECTION

PATENT NO. : 7,587,479 B2  Page 1 of 1
APPLICATION NO. : 10/949148
DATED : September 8, 2009
INVENTOR(S) : Anderson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1237 days.

Signed and Sealed this

Twenty-first Day of September, 2010

David J. Kappos
*Director of the United States Patent and Trademark Office*